(No Model.)
J. H. HERMANN.
CHECK ROW CORN PLANTER.
No. 309,542. Patented Dec. 23, 1884.
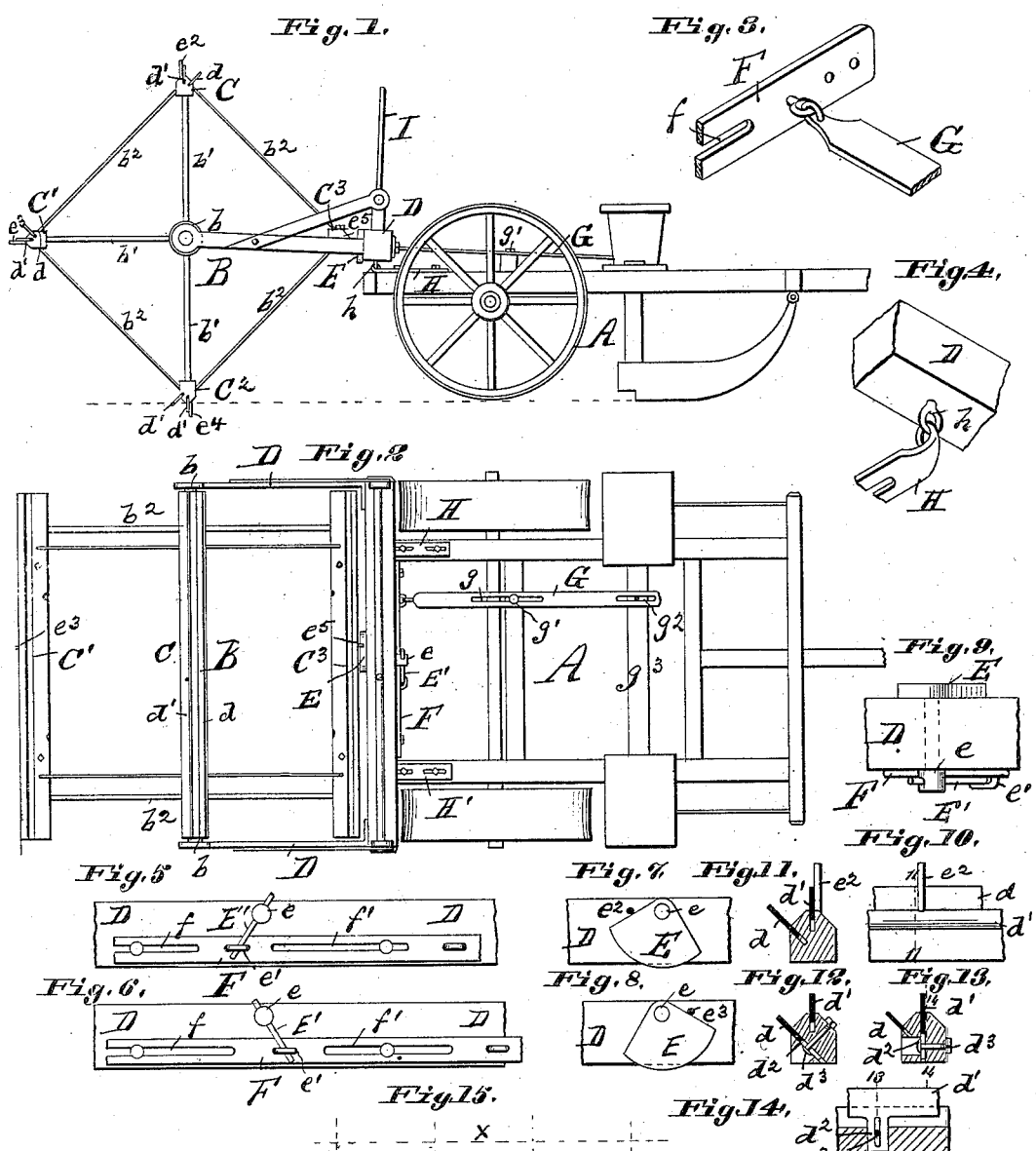

United States Patent Office.

JOHN H. HERMANN, OF HIGHLAND, ILLINOIS.

CHECK-ROW CORN-PLANTER.

SPECIFICATION forming part of Letters Patent No. 309,542, dated December 23, 1884.

Application filed July 28, 1884. (No model.)

*To all whom it may concern:*

Be it known that I, JOHN H. HERMANN, a citizen of the United States, residing at Highland, in the county of Madison and State of Illinois, have invented a new and useful Improved Check-Row Corn-Planter, of which the following is a specification.

The objects of my invention are to provide corn-planters with an automatic corn-row marker for marking the exact spot where the seed is planted.

I will first fully describe the construction and operation of my improvements, and hereinafter point out the novel features thereof in the claims. I attain these objects by the mechanism illustrated in the accompanying drawings, in which—

Figure 1 is a side elevation, showing my improved corn-row marker attached to an ordinary corn-planter. Fig. 2 is a top plan of the same parts shown in Fig. 1. Fig. 3 is a detail view of the connection between the reciprocating bar and the lever that operates the shaker-bar. Fig. 4 is also a detail view of the hinge joint connecting the slotted bars to the frame-work or cross-beam. Figs. 5 and 6 are respective side elevations of the same reciprocating bar to show the two positions it assumes when reciprocated. Figs. 7 and 8 show the reciprocating cam in its two positions. Fig. 9 is a plan view showing how the cam is journaled to its cross-beam and having a lever-arm connection to the reciprocating bar. Fig. 10 is a side view, and Fig. 11 a sectional view, of the wooden bar to which the blades are attached. Figs. 12, 13, 14 show a modified way of making the blades adjustable in the mortises of the wooden cross-bars. Fig. 15 is a diagram.

Similar letters refer to similar parts throughout the several views.

A represents an ordinary corn-planter. (See Figs. 1, 2.)

B represents my improved rotary corn-row marker. I have adapted the corn-row marker so that it can be applied to any ordinary corn-planter, and in use produces the transverse mark in the soil at right angle to the row made by the wheels of the planter, the point of intersection locating accurately the dropped seed; also, my improved corn-row marker at the same time operates the shaker-bar of the planter that controls the proper dropping of the corn, and all of which will now be fully described.

My corn-row marker B is constructively a wheel, consisting of an axis, $b$, having radial spokes $b'$, carrying the respective markers C C' C² C³, braced together by the rods $b^2$, as shown in Figs. 1 and 2. As such a wheel, the marker B is properly supported by its axis to turn in the frame D, and by means whereof it can be attached to the planter.

The respective markers C C' C² C³ consist of a cross-bar of wood, in the mortises of which are properly secured the two projecting metal blades $d$ $d'$, as clearly shown in Figs. 10, 11. The blade $d$ is secured in an incline position, hence serves to better grip in the soil and give a firm bearing to the corn-row marker B as it revolves behind the planter. The other blade, $d'$, is secured straight, and also projects sufficiently to enter the soil, and it is this blade (in all four) that makes the transverse row to mark out the place where the corn is dropped. I also show how both blades can be secured adjustably to the cross-bar of wood. By referring to Figs. 12, 13, 14, each blade can have a shank, $d^2$, one near each end. This shank is slotted, and by a bolt, $d^3$, passing through the wood and slot, the blade can be fastened. By these means the operator can raise and lower the blades and secure same for shallow or deep action to suit the nature of the soil, and to insure at all times on the part of the one blade a proper bearing in the ground, and for the other blade a decisiveness in marking the ground transversely as long as the corn-row marker is kept rotating and working with the planter.

E is a cam journaled at $e$ to the side of the cross-beam of frame D. (See Figs. 2, 7, 8, 9.) The journal $e$, passing through the cross-beam, carries the arm E', that engages the eye $e'$ of the reciprocating bar F. (See Figs. 2, 5, 6, 9.) It is the vibration of the cam that produces the reciprocation of the bar F, and this in turn reciprocates the shaker-bar of the planter, as will hereinafter appear. The revolving of the corn-row planter B vibrates the cam E, and this I effect by the four pins at $e^2$ $e^3$ $e^4$ $e^5$, (see Figs. 1, 2, 7, 8,) it being noted that a pair of said pins are set to strike the cam to the left, while the remaining two pins strike the cam to the right; or when the first pin has caused the cam to move the reciprocating bar into the position shown in Fig. 5 the next pin following will strike the cam to slide the reciprocating bar to the position shown in Fig. 6, which position is again reversed by the contact of the next following pin, and so on, producing a perfect reciprocating action on the part of the reciprocating bar F. For these purposes the bar F is secured to the side of the cross-beam by bolts passing through the respective slots $f f'$. (See Figs. 5, 6.) The bar F, near one end, is connected to the fulcrum-bar G, having a slot, $g$, and pivot-bolt at $g'$, top of the frame of the planter, the end of the bar G having the further slot at $g^2$, to adjustably connect it by bolt to the shaker-bar $g^3$, that controls the dropping of the corn. (See Figs. 1 and 2.) By this construction and arrangement of the parts the rotating corn-row marker at the same time while it marks the soil also controls the reciprocation of the shaker-bar of the planter.

To complete the attachment of the corn-row marker to the planter the parts are as follows: To the under side of the cross-beam of the supporting-frame D are eyebolts $h$, to each of which is fastened the ring end of the respective slotted metal bars H H'. (See Figs. 1, 2, 4.) Finally, both the slotted bars H H' are secured by bolts $h'$ top of the frame-work of the planter. The slots shown in all the bars F G' H H' are simple features to accommodate the proper fastening or attaching of the marker B to the planter A. The corn-row marker B can readily be lifted out of the soil by means of the hand-lever I, the eyebolts at $h$ serving as a hinge-joint for said purpose.

In the conjoint operation of the rotary marker B and the planter A there is always one row of dropped corn between the transverse row made by the marker and the line for dropping the first row of corn.

In Fig. 15 I show the illustration of a field with its rows marked off in the shape of squares. The wheels of the planter make the horizontal rows $x$ and the rotary corn-row marker B makes the equidistant transverse rows $x'$, the intersection of the rows indicating the place where the corn was planted.

What I claim is—

1. In a check-row corn-planter, the combination of wheel B, and the equidistant markers C C' C² C³, consisting of cross-bars, each provided with two blades, $d\ d'$, the former to grip into the soil, the latter to mark transverse rows, each of said blades further secured adjustably by means of bolts passing through the slotted shanks of said blades, substantially as and for the purposes set forth.

2. In a check-row corn-planter, the combination of the rotary marker B, the equidistant cross-bars thereof, carrying the metal blades $d\ d'$ and pins $e^2\ e^3\ e^4\ e^5$, the frame D, in which said marker revolves, and the journaled cam E, by means whereof the successive action of the said pins imparts a reciprocating movement to said cam, substantially as and for the purposes set forth.

3. In a check-row corn-planter, the combination of the rotary marker B, the cross-bars thereof, carrying the blades $d\ d'$, the pins at $e^2\ e^3\ e^4\ e^5$, the frame D, its journaled cam E, the connecting-arm E', and the reciprocating bar F, all constructed to operate in the manner and for the purposes set forth.

4. In a check-row corn-planter, the combination of the rotary marker B, the cross-bars thereof, carrying the blades $d\ d'$, also pins $e^2\ e^3\ e^4\ e^5$, the supporting-frame D, its journaled cam E, connecting-arm E', reciprocating bar F, fulcrum-bar G, and the shaker-bar $g^3$, of a corn-planter, all constructed and arranged to operate as and for the purposes set forth.

5. The combination of the rotary marker B, consisting, essentially, of equidistant cross-bars C C' C² C³, having the metal blades $d\ d'$, pins $e^2\ e^3\ e^4\ e^5$, the supporting-frame D, the journaled cam E, its arm E', the reciprocating bar F, the fulcrum-bar G, the shaker-bar $g^3$, the eyes $h$, the slotted bars H H', and the planter A, to operate as and for the purposes set forth.

In testimony of said invention I have hereunto set my hand.

JOHN H. HERMANN.

Witnesses:
WILLIAM W. HERTHEL,
JOHN W. HERTHEL.